United States Patent
Von Berg et al.

(10) Patent No.: US 8,111,885 B2
(45) Date of Patent: Feb. 7, 2012

(54) IMAGE PROCESSING DEVICE AND METHOD

(75) Inventors: Jens Von Berg, Hamburg (DE); Cristian Lorenz, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1172 days.

(21) Appl. No.: 11/815,456

(22) PCT Filed: Feb. 3, 2006

(86) PCT No.: PCT/IB2006/050360
§ 371 (c)(1),
(2), (4) Date: Aug. 3, 2007

(87) PCT Pub. No.: WO2006/085248
PCT Pub. Date: Aug. 17, 2006

(65) Prior Publication Data
US 2008/0260205 A1    Oct. 23, 2008

(30) Foreign Application Priority Data

Feb. 10, 2005  (EP) .................................... 05100966

(51) Int. Cl.
*G06K 9/00* (2006.01)
(52) U.S. Cl. .......................... 382/128; 382/154; 382/173
(58) Field of Classification Search .................. 382/128, 382/154, 173
See application file for complete search history.

(56) References Cited

U.S. PATENT DOCUMENTS

| 7,672,492 B2 * | 3/2010 | Shen et al. ..................... 382/128 |
| 2006/0008143 A1 * | 1/2006 | Truyen et al. ................. 382/173 |

FOREIGN PATENT DOCUMENTS

| WO | 2004036500 A2 | 4/2004 |
| WO | 2004051572 A2 | 6/2004 |

OTHER PUBLICATIONS

Cootes, T. F., et al.; Active Shape Models-Their Training and Application; 1995; Computer Vision and Image Understanding; 61(1)38-59.
Kaus, M. R., et al.; Automated segmentation of the left ventricle in cardiac MRI; 2004; Medical Image Analysis; 8:245-254.

(Continued)

Primary Examiner — Tom Y Lu

(57) ABSTRACT

The present invention relates to an image processing device and a corresponding image processing method for processing medical image data showing at least two image objects, including a segmentation unit for detection and/or segmentation of image objects in said image data. To allow a more accurate and better segmentation of target objects which are hard to localize and detect, it is proposed that the segmentation unit comprises: a selection unit (61) for selecting a target object for detection and/or segmentation and an intermediary object in said image data, which is easier detectable than said target object and for which position information about the spatial relationship to said target object are known, an intermediary object segmentation unit (62) for segmentation of said intermediary object in said image data, a target object detection unit (63) for detection and/or segmentation of said target object in said image data using said segmented intermediary object and said position information about the spatial relationship of said intermediary object to said target object.

20 Claims, 2 Drawing Sheets

OTHER PUBLICATIONS

Figure 1:
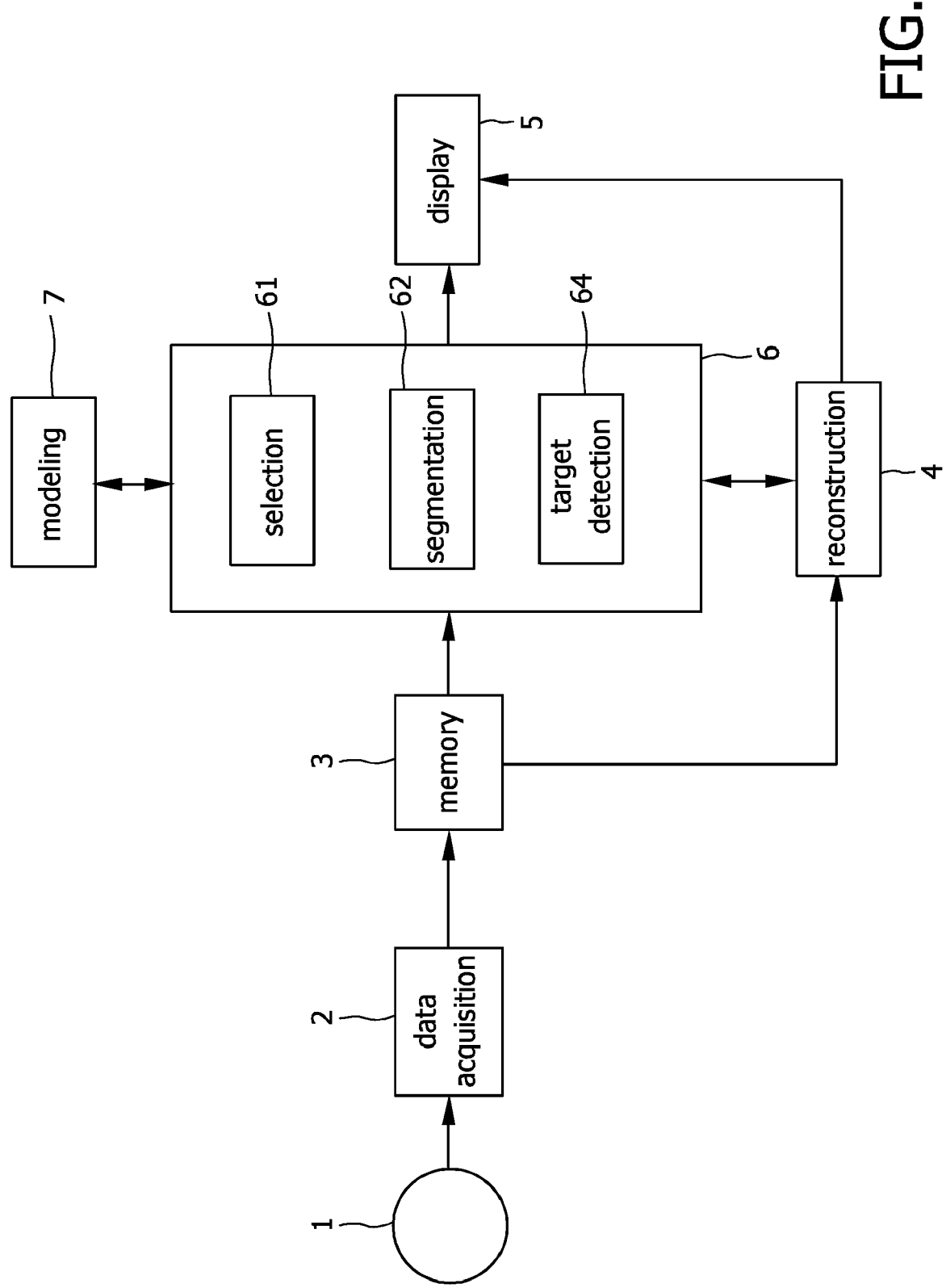

Lorenz, C., et al.; Modeling the coronary artery tree; 2004; IEEE Shape Modeling International; pp. 354-357.

Ramachandran, J., et al.; A hierarchical segmentation model for the lung and the inter-costal parenchymal regions of chest radiographs; 2002; IEEE Symposium on Circuits and Systems; vol. 1; pp. 439-442.

Weese, J., et al.; Shape Constrained Deformable Models for 3D Medical Image Segmentation; 2001; Proc. IPMI; pp. 380-387.

* cited by examiner

IMAGE PROCESSING DEVICE AND METHOD

The present invention relates to an image processing device and a corresponding image processing method for processing medical image data showing at least two image objects, including a segmentation unit for detection and/or segmentation of image objects in said image data. Further, the present invention relates to a computer program for implementing said image processing method on a computer.

In medical imaging different medical imaging modalities are available to provide image data of a region of interest of a patient's body. For instance, X-ray, computer tomography and magnetic resonance imaging are available to assess the condition of the coronary vasculature. Depending on the desired use of such image data, the imaged region of interest and other requirements it is often needed to segment a target organ or, more generally, a target image object from the medical image data, in particular from medical volume image data, that is hard to localize and detect.

Several different methods have been proposed for segmentation, whereof model-based segmentations are relevant here. These methods use a priori knowledge about the expected shape of the target object as complimentary information to the image features that make up the object's boundary in the image. This makes the segmentation robust even at imperfect image quality caused by e.g. image artifacts, partial volume effects, or improper field of view. This a priori knowledge may be either explicitly formulated or automatically learnt from a set of manually segmented training images (as e.g. described in T. Cootes, C. Taylor, D. Cooper, J. Graham: Active shapes models—their training and application. Computer Vision and Image Understanding 61(1), 38-59, 1995). A method explained in J. Weese, M. Kaus, C. Lorenz, S. Lobregt, R. Truyen, V. Pekar. Shape constrained deformable models for 3D medical image segmentation. In: Proc. IPMI, 380-387, 2001 uses such a priori knowledge to model the expected shape of the surface of the target object both as initialization and as regularization constraint during the adaptation of a deformable surface model to the image features. This method is suitable for cardiac chamber segmentation as, for instance, described in M. R. Kaus, J. von Berg, J. Weese, W. Niessen, V. Pekar. Automated segmentation of the left ventricle in cardiac MRI. Med. Img. Anal. 8 245-254, 2004. For tree-like structures like the coronaries of the heart rather centerlines and bifurcation points are the relevant shape parameters than a complete surface description (see e.g. C. Lorenz, J. von Berg, T. Bülow, S. Renisch, S. Wergand. Modeling the coronary artery tree. In Proc. of IEEE International Conference on Shape Modeling and Applications 2004 (SMI'04), Genova, Italy June 2004 p 354-357).

It is an object of the present invention to provide an image processing device and a corresponding image processing method which allow for a better, faster and simpler segmentation and which leads to better segmentation results, in particular for segmentation of an image object which is hard to localize and detect.

The object is achieved according to the present invention by an image processing device comprising:

a selection unit for selecting a target object for detection and/or segmentation and an intermediary object in said image data, which is easier detectable than said target object and for which position information about the spatial relationship to said target object are known, an intermediary object segmentation unit for segmentation of said intermediary object in said image data, a target object detection unit for detection and/or segmentation of said target object in said image data using said segmented intermediary object and said position information about the spatial relationship of said intermediary object to said target object.

A corresponding image processing method is defined herein. A computer program for causing a computer to carry out the steps of the image processing method according to the invention when said computer program is executed on a computer is defined herein.

The present invention is based on the idea that, instead of performing an immediate target segmentation, an intermediary object is segmented first and used as a reference for the target object detection and segmentation.

For the segmentations of objects from volume image data prior information about the expected shape of the objects has been successfully used to constrain the search domain. Statistical shape models capture this information explicitly. Information about the expected position of a target object, however, is mostly coded implicitly in the segmentation algorithm, relative to a specific well detectable landmark. According to the present invention a shape model is adapted to a well detectable and/or segmentable intermediary object in order to detect and/or segment another object, i.e. the target object, that is harder to find. The adapted shape model of the intermediary object and known position information about the spatial relationship of said intermediary object to said target object are then used for detection and/or segmentation of the target object in the image data.

Using the intermediary object as a reference landmark as proposed according to the present invention has the advantage of an a priori estimation of the position of the target object. This generally constrains the search space, but it also may bias feature search towards positions with high a priori probabilities. The approach of this invention is generic and more general than using an application specific landmark with application specific features to detect. It may benefit from a growing number of organ models used for different applications that can be re-used. Due to the common means of modeling the intermediary object as well as the target object, the approach is transitive and the once determined target organ may serve as intermediary object for further segmentation tasks.

Preferably, both the intermediary object and the target object are described by shape models. This has the advantage that also shape expectations of the target object can be coded. Instead of just statistically modeling the shape of a given object class, both the intermediate object class and the target object class are modeled. In addition, the correlation between both can be modeled in a way that enables the estimation of target object shape parameters from a given intermediate object parameter set. Let i be the shape parameters of the intermediate object and t the shape parameters of the target object. The a posteriori probability $P(t_i|i_j)$ gives the probability of a target object shape $t_i$ once an intermediate object $i_j$ was observed. A Bayesian framework (see e.g. R. O. Duda, P. E. Hart. Pattern classification and scene analysis. John Wiley & sons, 1973) may both provide $P(t_i|i_j)$ for a given $i_j$ and the most likely target shape $t_{max,j}$ by $t_{max,j}$ argmax$_i$ $P(t_i|i_j)$ for a given $i_j$. Once the intermediate object was segmented yielding parameter set $i_j$, $t_{max,j}$ is a good initialization for the deformable shape of the target object and $P(t_i|i_j)$ may be used as regularization during deformable model adaptation that gives a bias towards expected shape configurations.

In addition, the spatial relationship between both is preferably modeled, for instance by means of metrics (position of t with respect to i) or topology (probability of intersection or contact between both). Stochastic expressions similar to the one introduced above may be used.

Once the model of the intermediary object is adapted to fit a given instance in the image, position, orientation and/or shape of this instance are preferably determined. These data are then advantageously used to predict position, orientation and/or shape of the target object, in particular by use of the a posterior probability given that adaptation instead of the a priori probability of that target object alone. The predictions are used to initialize and constrain the adaptation of the deformable model to the target object, i.e. position, orientation and/or shape of the target object. The a posterior probability is a better cue for the target object detection and segmentation than the a priori model of the target organ alone whenever the intermediate object is easier and more reliable to be segmented and/or whenever its particular shape parameters determine well the properties of the target organ.

According to further embodiments of the invention it is proposed that several intermediary objects are used for detection/segmentation of the target object, that several target objects are used and/or that a spatio-temporal model is used for moving objects. Still further, an earlier detected and/or segmented target object can also be used as an intermediary object in another run of the segmentation method in order to find another target object.

Figure 2:
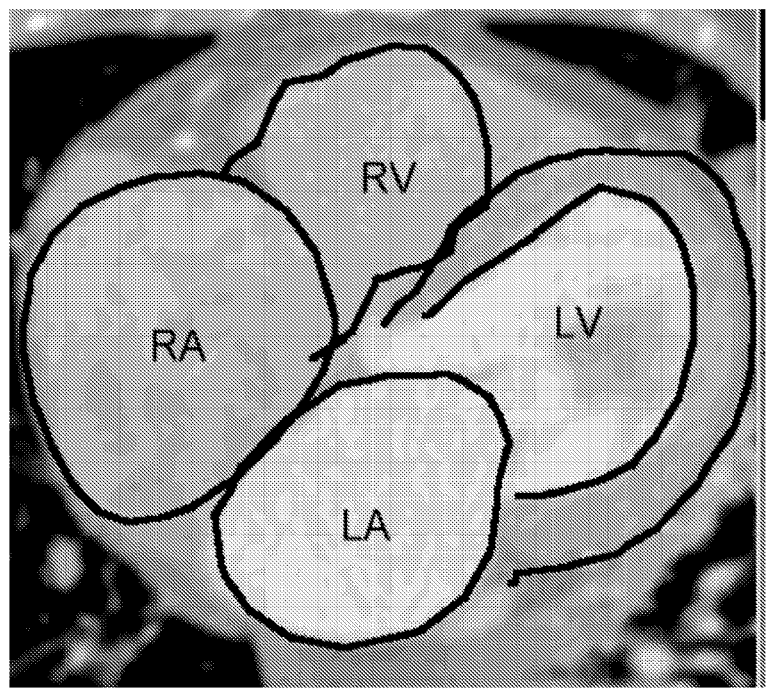
Figure 3:
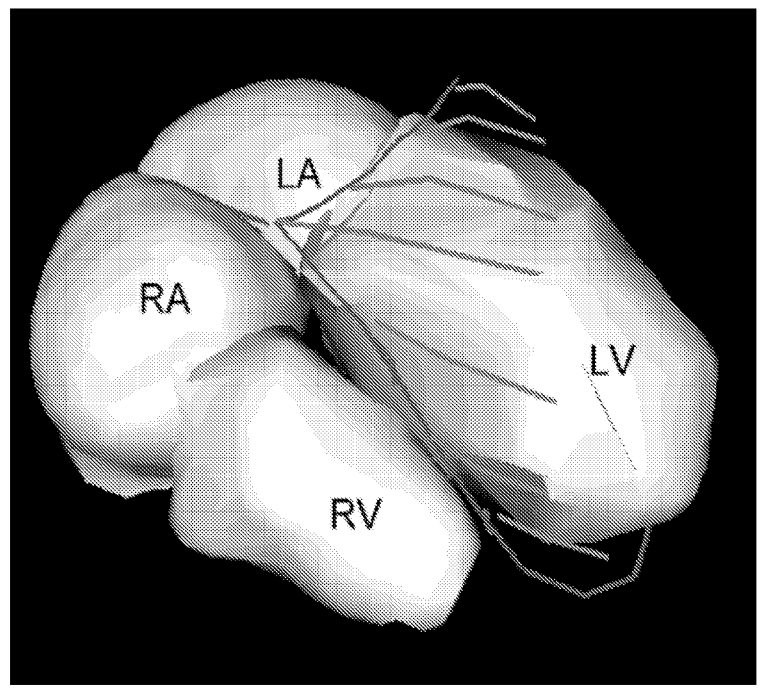

The invention will now be explained in more detail in an only exemplary way with reference to the drawings in which FIG. 1 shows a schematic block diagram of an image processing device according to the present invention, FIG. 2 shows shape models of well detectable objects, the cardiac chambers, roughly adapted to volume image data and FIG. 3 shows a three-dimensional view on these shape models and predicted positions of coronaries of the heart.

The block diagram of the image processing device according to the invention illustrated in FIG. 1 schematically shows an object 1, for instance a patient, from which image data, in particular volume image data, can be acquired by a data acquisition unit 2, which can generally be any medical imaging device, such as a computer tomograph, a magnetic resonance imaging unit, an X-ray device or an ultrasound unit. The acquired data are generally stored in a memory 3, such as a hard disc of a workstation or a server in a medical computer network. Generally an image processing device includes a reconstruction unit 4 for reconstructing images from the acquired image data for display on a display unit 5. Furthermore, for segmentation of a target object in the image data a segmentation unit 6 is provided.

While known segmentation units directly segment a desired target object from the image data, the segmentation unit 6 according to the present invention comprises several units 61 to 63 by which first an intermediary object, from which position information about the spatial relationship to the target object is known, is detected and used as a reference landmark for the target object detection/segmentation. In particular, the segmentation unit 6 comprises a selection unit 61 by which the target object class and the intermediary object class are determined by the user, e.g. by a command like "determine shape and position of the left anterior descending coronary artery by use of the left ventricle shape". More likely, such commands are coded in application specific procedures that have been built to serve a required diagnostic or therapeutic task like coronary assessment.

Furthermore, an intermediary object segmentation unit 62 is provided by which the intermediary object is segmented in the image data. For this purpose, a generally known segmentation method, as for instance described in the above mentioned articles of J. Weese et al. or M. R. Kaus et al. can be used. Preferably, an intermediary deformable shape model is adapted to said intermediary object yielding its segmentation. In particular, position, orientation and/or shape information of the adapted intermediary shape model can be determined from the model parameters.

Finally, a target object detection unit 63 is provided by which the target object is detected and/or segmented in the image data. Therefore, the segmented intermediary object (e.g. the adapted intermediary object shape model), in particular the determined position, orientation and/or shape information thereof, and the known position information about the spatial relationship between said intermediary object and said target object are used. This is again preferably done with a deformable shape model.

Preferably, the position, orientation and/or shape of the target object are predicted by surface model parameters with maximum likelihood of the a posteriori probability. During the adaptation of the deformable shape model the a posterior probability is used in the objective function to bias the shape towards expected shape configurations.

By use of the segmentation unit 6 according to the present invention target objects which are difficult to localize and detect can be easier segmented. Spatial relationship between an intermediary object used as a reference landmark and the target object need to be known. Information about such spatial relationship can be obtained by explicit formalization or by statistical learning from well segmented training image sets. For this purpose, a separate modeling unit 7 is provided, that is used in the training phase with the training images. It calculates a priori models for each object class (at least two are needed: the intermediate object class and the target object class), that can later be used by the segmentation unit 6 to generate a posteriori priors for the target organ class.

The obtained segmentation of the target object in the image data can be advantageously used in the reconstruction unit 4 for generating reconstruction images which more accurately and reliably show the target object, for instance in image guided interventions. It can be also used for diagnostic procedures that need geometric measures of the target organ (volume, diameters, etc.).

FIGS. 2 and 3 illustrate an application scenario for a cardiac assessment using the large chambers (ventricles and atria) as intermediary objects for coronary segmentation. Most coronary segmentation algorithms follow the branches of the coronary tree starting from a proximal part (the ostia) and/or from a distal part. They propagate along the coronaries as long as local image features match with a given criteria. Using the present invention, segmentation is first performed for the large and well detectable chambers and then for the coronaries, guided by a model of the spatial interrelationship between both. The model captures the spatial relationship between coronary positions and the vessel boundaries. Also some relevant landmarks of the ventricular system are located in the model such as the junction of left and right epicardium, the apex, the valve plane and the valve centers. Both interindividual varieties and deformation due to heartbeat are captured and modeled statistically. The modeled inter-individual varieties include the distinction of prevalent heart supplier types (e.g. left dominance vs. right dominance), but also the variation of positions of coronary landmarks (e.g. bifurcation points).

FIG. 2 thus shows shape models of well detectable chambers that may serve as intermediate objects (left ventricle LV, right ventricle RV, left atrium LA, right atrium RA) adapted to volume image data, in particular one cut plane thereof. FIG. 3 shows a three-dimensional rendering of these shape models and a model of predicted positions of the coronaries (i.e.

target objects) obtained by use of the present invention. In particular, centerlines of left anterior descending coronary artery (LAD), the left anterior circumflex (LAX) and some sub-branches are shown. Particularly, the chambers are modeled by a triangular surface model as described in the above mentioned article of J. Weese et al., and the coronaries are modelled by centerlines of their sub branches as described in the above mentioned article of C. Lorenz et al.

The invention claimed is:

1. Image processing device for processing medical image data showing at least two image objects, including a segmentation unit for detection and/or segmentation of image objects in said image data, said segmentation unit comprising:
    a selection unit for selecting a target object for detection and/or segmentation and an intermediary object in said image data, which is more easily detectable than said target object and for which position information about the spatial relationship to said target object are known,
    an intermediary object segmentation unit for segmentation of said intermediary object in said image data, and
    a target object detection unit for detection and/or segmentation of said target object in said image data using said segmented intermediary object and said position information about the spatial relationship of said intermediary object to said target object without using part of a segmentation of the target object.

2. Image processing device as claimed in claim 1,
    wherein said target object detection unit is operative for predicting position, orientation and/or shape of said target object before detection and/or segmentation of said target object.

3. Image processing device as claimed in claim 2, comprising:
    an intermediary modeling unit that produces an adapted intermediary shape model from the intermediary object,
    wherein said intermediary modeling unit is operative for determining position, orientation and/or shape information of said adapted intermediary shape model, and
    wherein said target object detection unit is operative for using said position, orientation and/or shape information for predicting the position, orientation and/or shape of said target object.

4. Image processing device as claimed in claim 1,
    wherein said target object detection unit is operative for additionally using a shape model of said target object for detection and/or segmentation of said target object.

5. Image processing device as claimed in claim 1,
    wherein said target object detection unit is operative for additionally using a model of the spatial relationship between said intermediary object and said target object for detection and/or segmentation of said target object.

6. Image processing device as claimed in claim 1,
    wherein said segmentation unit is operative for using more than one intermediary objects in said image data, which are more easily detectable than said target object and for which position information about the spatial relationship to said target object are known, for detection and/or segmentation of said target object.

7. Image processing device as claimed in claim 1,
    wherein said selection unit is operative for selecting an earlier detected and/or segmented target object as intermediary object.

8. Image processing device as claimed in claim 1,
    wherein said intermediary object segmentation unit is operative for adapting an intermediary object shape model to said intermediary object to obtain said segmented intermediary object.

9. Image processing method for processing medical image data showing at least two image objects, including a segmentation unit for detection and/or segmentation of image objects in said image data, said segmentation unit comprising the steps of:
    selecting a target object for detection and/or segmentation and an intermediary object in said image data, which is easier to detect than said target object and for which position information about the spatial relationship to said target object are known, where the intermediary object is not part of the target object;
    segmentation of said intermediary object in said image data, and
    detection and/or segmentation of said target object in said image data exclusively using said segmented intermediary object and said position information about the spatial relationship of said intermediary object to said target object.

10. The image processing method of claim 9, comprising:
    predicting position, orientation and/or shape of said target object before detection and/or segmentation of said target object, where the prediction is based exclusively on a position, orientation and/or shape of the intermediary object.

11. The image processing method of claim 9, comprising:
    producing an adaptive intermediary shape model for the intermediary object,
    determining position, orientation and/or shape information of said adapted intermediary shape model, and
    using position, orientation and/or shape information of said adapted intermediary shape model in predicting position, orientation and/or shape of said target object before detection and/or segmentation of said target object.

12. The image processing method of claim 9, comprising:
    using a shape model of said target object for detection and/or segmentation of said target object.

13. The image processing method of claim 9, comprising:
    using a model of the spatial relationship between said intermediary object and said target object for detection and/or segmentation of said target object.

14. The image processing method of claim 9, comprising:
    using more than one intermediary object in said image data, which are more easily detectable than said target object and for which position information about the spatial relationship to said target object are known, for detection and/or segmentation of said target object.

15. The image processing method of claim 9, comprising:
    selecting an earlier detected and/or segmented target object as said intermediary object.

16. The image processing method of claim 9, comprising:
    adapting an intermediary object shape model to said intermediary object to obtain said segmented intermediary object.

17. Image processing method for processing medical image data showing at least two image objects, including a segmentation unit for detection and segmentation of image objects in the image data, the segmentation unit, comprising:
    identifying a target object in the medical image;
    identifying an intermediary object in the medical image data, where the intermediary object is more easily detectable than the target object, where a position information about a spatial relationship between the target object and intermediary object is known, and where the intermediary object is not part of the target object;
    segmentating of the intermediary object in the image data;

determining position, orientation and/or shape of the intermediary object;

predicting position, orientation and/or shape of the target object in the image data based only on the position, orientation and/or shape of the intermediary object; and detecting the target object in the image data by using:
- the segmented intermediary object as a reference landmark,
- the predicted position, orientation and/or shape of the target object and not a segmented target object, and
- the position information about the spatial relationship of the intermediary object to the target object.

18. The image processing method of claim 17, where position, orientation and/or shape of the target object is predicted by using posterior probability.

19. The image processing method of claim 17, where shape of the target object is predicted by using surface model parameters with maximum likelihood of a posteriori probability and where a shape of the target object is biased from the predicted shape of the target object.

20. The image processing method of claim 17, where a spatio-temporal model is used to detect the target object when the target object is a moving object.

* * * * *